US012679985B2

(12) United States Patent (10) Patent No.: US 12,679,985 B2
Yuhara et al. (45) Date of Patent: Jul. 14, 2026

(54) RESIN COMPOSITION, AQUEOUS INK FOR INK JET RECORDING, INK JET RECORDING DEVICE, AND INK JET RECORDING METHOD

(71) Applicant: BROTHER KOGYO KABUSHIKI KAISHA, Nagoya (JP)

(72) Inventors: Keisuke Yuhara, Nagoya (JP);
Hiroyuki Tanaka, Inazawa (JP);
Makito Iguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 119 days.

(21) Appl. No.: 18/598,227

(22) Filed: Mar. 7, 2024

(65) Prior Publication Data

US 2024/0301227 A1 Sep. 12, 2024

(30) Foreign Application Priority Data

Mar. 9, 2023 (JP) ................................. 2023-036484

(51) Int. Cl.
*C09D 11/322* (2014.01)
*C09D 11/033* (2014.01)
(52) U.S. Cl.
CPC .......... *C09D 11/322* (2013.01); *C09D 11/033* (2013.01)
(58) Field of Classification Search
CPC ........ B41J 11/0021; B41J 2/01; B41M 7/009; B41M 5/0047; C09D 11/32; C09D 11/36; C08K 5/3437
See application file for complete search history.

(56) References Cited

U.S. PATENT DOCUMENTS

| | | | |
|---|---|---|---|
| 5,609,671 A | 3/1997 | Nagasawa | |
| 9,056,993 B2 * | 6/2015 | Matsuyama | ......... C09D 11/322 |
| 2008/0241398 A1 | 10/2008 | Kato et al. | |

(Continued)

FOREIGN PATENT DOCUMENTS

| | | |
|---|---|---|
| EP | 3006519 A1 | 4/2016 |
| EP | 4067444 A2 | 10/2022 |

(Continued)

OTHER PUBLICATIONS

Extended European Search Report issued Jul. 23, 2024 in corresponding European Patent Application No. 24159544.6, 6 pages.

*Primary Examiner* — John P Zimmermann
(74) *Attorney, Agent, or Firm* — Element IP, PLC

(57) ABSTRACT

A resin composition includes: resin particles including a resin; water; a first solvent having a boiling point of less than 250° C.; and a second solvent having a boiling point of 250° C. or more. A relative energy difference (RED), $R_a/R_0$, in the Hansen solubility parameter (HSP) system between the second solvent and the resin is 3 or less. $R_a$ is an HSP distance between the second solvent and the resin. $R_0$ is a radius of a Hansen sphere of the resin. The Hansen sphere is determined so as to include coordinates of solvents having a boiling point of 250° C. or more in which the resin is dissolvable. A mass ratio of the second solvent to a solid component the resin particles in the resin composition is 0.7 to 2.3.

10 Claims, 1 Drawing Sheet

(56) References Cited

U.S. PATENT DOCUMENTS

| | | | |
|---|---|---|---|
| 2013/0012622 A1* | 1/2013 | Li | C09D 11/36 |
| | | | 523/455 |
| 2014/0132684 A1* | 5/2014 | Ohta | B41M 7/009 |
| | | | 347/102 |
| 2015/0191031 A1* | 7/2015 | Ohta | B41M 5/0011 |
| | | | 428/207 |
| 2016/0083603 A1 | 3/2016 | Okuda | |
| 2017/0130081 A1 | 5/2017 | Toyama et al. | |
| 2021/0108097 A1 | 4/2021 | Hongo et al. | |
| 2022/0033672 A1* | 2/2022 | Ishida | C09D 11/54 |
| 2022/0258495 A1* | 8/2022 | Sato | B41J 2/01 |

FOREIGN PATENT DOCUMENTS

| | | | |
|---|---|---|---|
| JP | H08-3498 A | 1/1996 |
| JP | 2000513396 A | 10/2000 |
| JP | 2008524400 A | 7/2008 |
| JP | 2008246821 A | 10/2008 |
| JP | 2009515007 A | 4/2009 |
| JP | 2011515535 A | 5/2011 |
| JP | 2016060168 A | 4/2016 |
| JP | 2017088843 A | 5/2017 |
| JP | 2017186472 A | 10/2017 |
| WO | WO-97048769 A1 | 12/1997 |
| WO | WO-2006066132 A2 | 6/2006 |
| WO | WO-2007053564 A2 | 5/2007 |
| WO | WO-2009117071 A1 | 9/2009 |
| WO | WO-2020049929 A1 | 3/2020 |
| WO | WO-2020241018 A1 | 12/2020 |

* cited by examiner

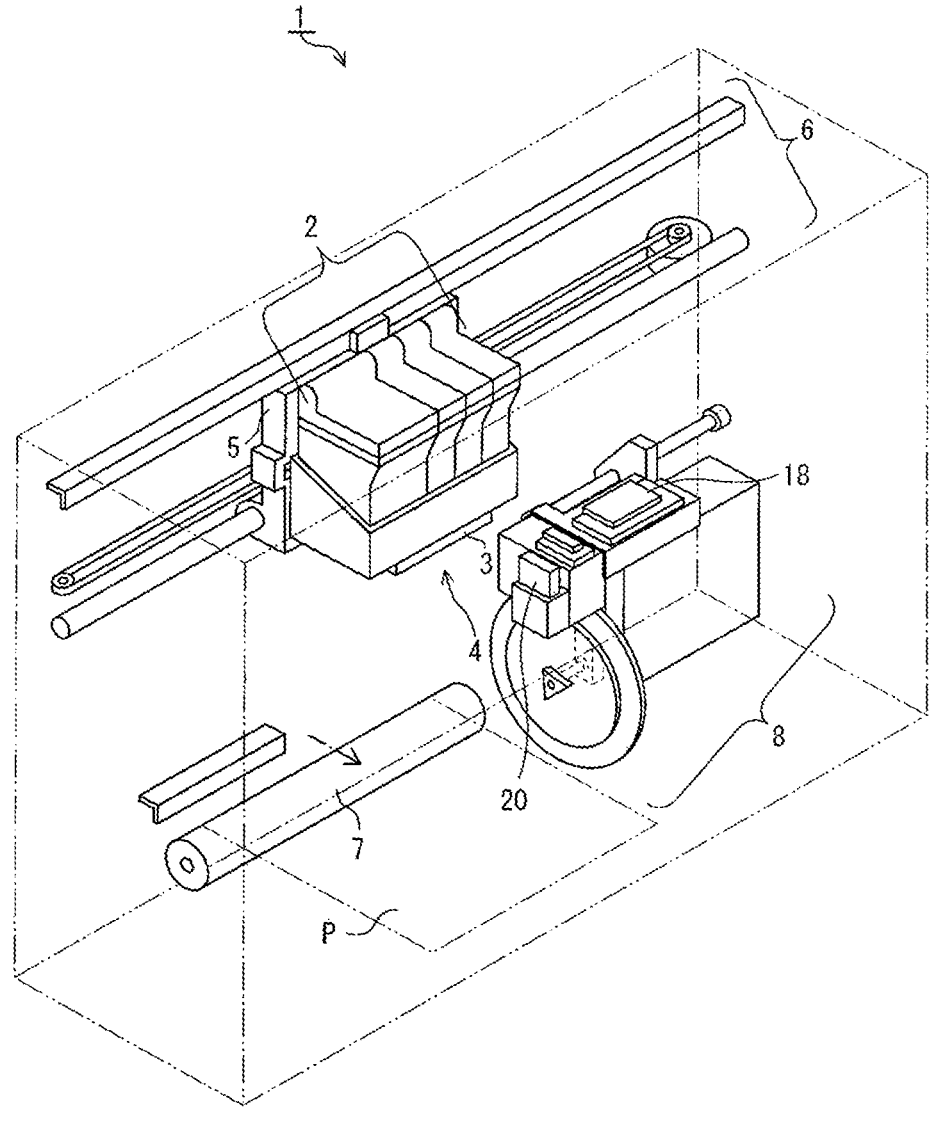

RESIN COMPOSITION, AQUEOUS INK FOR INK JET RECORDING, INK JET RECORDING DEVICE, AND INK JET RECORDING METHOD

REFERENCE TO RELATED APPLICATIONS

This application claims priority from Japanese Patent Application No. 2023-036484 filed on Mar. 9, 2023. The entire content of the priority application is incorporated herein by reference.

BACKGROUND ART

A related-art ink is capable of forming an image on a non-absorbent base material. In recent years, with spread of COVID-19, a printed matter is often wiped with chemicals for a purpose of sterilization, and thus solvent resistance of a coating film after image formation is required.

SUMMARY

A resin composition according to an aspect of the present disclosure includes: resin particles including a resin; water; a first solvent having a boiling point of less than 250° C.; and a second solvent having a boiling point of 250° C. or more. A relative energy difference (RED), $R_a/R_0$, in the Hansen solubility parameter (HSP) system between the second solvent and the resin is 3 or less. $R_a$ is an HSP distance between the second solvent and the resin. $R_0$ is a radius of a Hansen sphere of the resin. The Hansen sphere is determined so as to include coordinates of solvents having a boiling point of 250° C. or more in which the resin is dissolvable. A mass ratio of the second solvent to a solid component of the resin particles in the resin composition is 0.7 to 2.3.

An aqueous ink for ink jet recording according to another aspect of the present disclosure includes: the above-described resin composition and a pigment.

An ink jet recording device according to a further aspect of the present disclosure includes: the above-described resin composition; a flow path through which the resin composition flows; and an applying unit connecting to the flow path and configured to apply the resin composition onto an object for recording.

An ink jet recording device according to a further aspect of the present disclosure includes: the above-described aqueous ink; a flow path through which the aqueous ink flows; and an applying unit connecting to the flow path and configured to apply the aqueous ink onto an object for recording.

An ink jet recording method according to a further aspect of the present disclosure includes: applying the above-described resin composition onto a recording medium by an ink jet method.

An ink jet recording method according to a further aspect of the present disclosure includes: applying the above-described aqueous ink onto a recording medium by an ink jet method.

BRIEF DESCRIPTION OF DRAWINGS

A more complete appreciation of the disclosure and many of the attendant advantages thereof will be readily obtained as the same becomes better understood by reference to the following detailed description when considered in connection with the accompanying drawings, wherein: the FIG- URE is a schematic perspective view showing a configuration of an example of an ink jet recording device of the present disclosure.

DESCRIPTION

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

In the present disclosure, the term "mass" may be read as "weight" unless otherwise specified. For example, "mass ratio" may be read as "weight ratio" unless otherwise specified, and "% by mass" may be read as "% by weight" unless otherwise specified.

In the present disclosure, "HSP" means a "Hansen solubility parameter" unless otherwise specified.

In the present disclosure, "RED" means a relative energy difference between a Hansen sphere radius ($R_0$) and an HSP distance ($R_a$) unless otherwise specified.

In order to improve coating performance including the solvent resistance of the coating film, for example, if a solvent that easily dissolves a resin contained in the ink is added, the resin is considered to swell as the resin and the solvent are mixed, and as a result, it is presumed that the coating film on the base material is sufficiently formed and the coating performance is improved (that is, the solvent resistance of the coating film is improved). On the other hand, when an excessively large amount of the solvent that easily dissolves the resin is added, for example, since a swelling property of the resin is increased, storage stability of the ink may be reduced.

In an embodiment of the present disclosure, a resin composition includes: resin particles, water, a first solvent, and a second solvent. The first solvent is a solvent having a boiling point of less than 250°. The second solvent is a solvent having a boiling point of 250° C. or more, and RED is 3 or less. The RED which indicates a relative energy difference ($R_a/R_0$) calculated from an HSP distance ($R_a$) between the second solvent and the resin particles and a radius ($R_0$) of a sphere (Hansen sphere) including only a plot of the second solvent in which the resin particles are dissolved in a Hansen space. The HSP distance is calculated from an HSP value of the second solvent and an HSP value of the resin particles. The HSP value of the resin particles is calculated from a center coordinate of the Hansen sphere A blending ratio (S2/R) of a blending amount (S2) of the second solvent to a solid blending amount (R) of the resin particles is 0.7 to 2.3.

An aqueous ink for ink jet recording according to another embodiment includes: the above-described resin composition and a pigment.

An ink jet recording device according to a further embodiment includes: a flow path; and an applying unit, wherein a resin composition supplied to the flow path is applied to an object by the applying unit, and wherein the resin composition is the above-described resin composition.

An ink jet recording device according to a further embodiment includes: a flow path; and an applying unit, wherein an aqueous ink supplied to the flow path is applied to an object by the applying unit, and wherein the aqueous ink is the above-described aqueous ink for ink jet recording.

An ink jet recording method according to a further embodiment includes: a recording step of performing recording by applying a resin composition to a recording medium by an ink jet method, wherein the resin composition is the above-described resin composition.

An ink jet recording method according to a further embodiment includes: a recording step of performing recording by applying an aqueous ink to a recording medium by an ink jet method, wherein the aqueous ink is the above-described aqueous ink for ink jet recording.

A resin composition of the present embodiment can achieve both storage stability and solvent resistance.

The resin particles are not particularly limited as long as the resin particles satisfy the following condition of the relative energy difference $(R_a/R_0)$. The resin fine particles may be contained in, for example, a resin emulsion. The resin emulsion is formed by, for example, the resin particles and a dispersion medium (for example, water), and the resin particles are not dissolved in the dispersion medium, but are dispersed with a specific particle diameter. For example, commercially available products may be used as the resin particles. The resin particles are, for example, resin particles containing polyacrylic acid or a polyacrylic ester as a main component, and examples of monomers that can be used in the resin particles include (meth)acrylic acid esters such as (meth)acrylic acid, methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, pentyl (meth)acrylate, 2-ethylhexyl (meth) acrylate, octyl (meth)acrylate, cyclopropyl (meth)acrylate, cyclopentyl (meth)acrylate, cyclohexyl (meth)acrylate, cycloheptyl (meth)acrylate, cyclooctyl (meth)acrylate, phenyl (meth)acrylate, benzyl (meth)acrylate, tolyl (meth)acrylate, tisilyl (meth)acrylate, and phenethyl (meth)acrylate. In the present disclosure, the term "(meth) acrylic" means "at least one of acrylic and methacrylic". The term "(meth) acrylic acid" means "at least one of acrylic acid and methacrylic acid". The term "(meth)acrylate" means "at least one of acrylate and methacrylate".

The water may be ion exchanged water, pure water, or the like. A blending amount (water ratio) of the water with respect to a total amount of the resin composition is appropriately determined according to desired ink characteristics and the like. The water ratio may be, for example, the balance of other components. The blending amount of the water is, for example, 50% by mass or more, 55% by mass or more, or 60% by mass or more, and 95% by mass or less, 90% by mass or less, or 80% by mass or less. For example, the blending amount is 50% by mass to 95% by mass, preferably 55% by mass to 90% by mass, and more preferably 60% by mass to 80% by mass.

As described above, the first solvent is a solvent having a boiling point of less than 250° C. Examples of the first solvent include 1,3-propanediol, 1,2-hexanediol, propylene glycol, triethylene glycol, n-propanol, furfuryl alcohol, tetrahydrofurfuryl alcohol, t-butanol, ethylene glycol, dipropylene glycol, dipropylene glycol methyl ether, dipropylene glycol n-butyl ether, 2-methyl-1,3-propanediol, 1,2-butanediol, 1,3-butanediol, 1,4-butanediol, 1,4-butenediol, 2-methyl-2,4-pentanediol, β-thiodiglycol, 1,2,6-hexanetriol, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol monophenyl ether, triethylene glycol monomethyl ether, ethylene glycol monobutyl ether acetate, ethylene glycol monomethyl ether acetate, ethylene glycol monoethyl ether acetate, N-methyl-2-pyrolidone, 2-dimethylaminoethanol, 4-butyrolactone, F-caprolactone, and 3-methoxy-1-butanol.

As described above, the second solvent is a solution having a boiling point of 250° C. or more. The second solvent functions as, for example, a film formation assistant. Examples of the second solvent include tripropylene glycol, triethylene glycol, triethylene glycol monoethyl ether, triethylene glycol monobutyl ether, 1,6-hexanediol, tripropylene glycol butyl ether, polyethylene glycol monomethyl ether, polyethylene glycol 200, polyethylene glycol 400, polyethylene glycol 600, polyethylene glycol 800, glycerin, 2-pyrolidone, 1,2,4-butanetriol, and trimethylolethane.

In the second solvent, RED indicating a relative energy difference $(R_a/R_0)$ calculated from a HSP distance $(R_a)$ between the second solvent and the resin particles and a radius $(R_0)$ of a sphere (hereinafter, may be referred to as a "Hansen sphere") including only a plot of the second solvent in which the resin particles are dissolved in a Hansen space is 3 or less, and preferably 2.6 or less, 1.6 or less, or 1.0 or less.

The HSP distance is calculated from an HSP value of the second solvent and an HSP value of the resin particles. The HSP value of the resin particles is calculated from a center coordinate of the Hansen sphere. The HSP distance can be calculated, for example, by the following method.

First, the second solvent and the resin particles are mixed at any ratio. The any ratio is, for example, equivalent. A result of the mixing is visually observed to check a change in properties of the mixture. The change in property is, for example, a change in physical property or appearance before and after the mixing, such as gelling or white-clouding. Next, the HSP value of the second solvent is calculated using a known device in the related art, and is plotted on a three-dimensional coordinate (Hansen space). The HSP value may be, for example, a measurement value derived from an experiment or the like, or a document value described in a document or the like. Next, the Hansen sphere containing all the second solvent in which a property of the resin particles have been changed by the mixing is formed on the Hansen space. The center coordinate of the Hansen sphere is defined as the HSP value of the resin particles. The HSP distance $(R_a)$ can be calculated from the HSP value of the second solvent and the HSP value of the resin particles. The HSP distance $(R_a)$ can be calculated from the following calculation formula (1).

$$R_a^2 = 4 \times (dD_1 - dD_2)^2 + (dP_1 - dP_2)^2 + (dH_1 - dH_2)^2 \qquad (1)$$

In the calculation formula (1), $dD_1$ is energy due to dispersion force between molecules of the second solvent, $dP_1$ is energy due to a dipole interaction between the molecules of the second solvent, $dH_1$ is energy due to hydrogen bonds between the molecules of the second solvent, $dD_2$ is energy due to dispersion force between molecules of the resin particles, $dP_2$ is energy due to a dipole interaction between the molecules of the resin particles, and $dH_2$ is energy due to hydrogen bonds of the molecules of the resin particles.

As described above, a blending ratio (S2/R) of a blending amount (S2) of the second solvent to a solid blending amount (R) of the resin particles is 0.7 to 2.3, and preferably 0.9 to 2.0 from the viewpoint of improving solvent resistance.

A blending ratio (S2/S1) of the blending amount (S2) of the second solvent to a blending amount (S1) of the first solvent is, for example, 0.3 to 3.0, 0.3 to 1.5, or 0.3 to 2.0.

A total amount (S1+S2) of the blending amount (S1) of the first solvent and the blending amount (S2) of the second solvent is, for example, 30 or less, 28 or less, or 25 or less.

A viscosity of the resin composition may be, for example, 20 mPa·s or less, 10 mPa·s or less, 7 mPa·s or less, or 5 mPa·s or less, and 1 mPa·s or more, or 2 mPa·s or more. For example, the viscosity is 1 mPa·s to 20 mPa·s, and preferably 2 mPa·s to 10 mPa·s.

It is estimated that the resin composition of the present disclosure improves coating performance including the solvent resistance, for example, by the following mechanism. In order to exhibit original performance of the coating film mainly made of a resin and improve the coating performance including the solvent resistance, a film forming property of the coating film is important. In order to improve the film forming property of the coating film, it is necessary to adjust a mixing property of the film formation assistant (for example, the second solvent in the present disclosure) and the resin (for example, the resin particles in the present disclosure, hereinafter simply referred to as the "resin") that functions as the coating film, and a drying property of the coating film.

Here, an HSP distance between the resin and the film formation assistant is important in mixing property of the film formation assistant and the resin. When one having a long HSP distance is selected, since the resin and the film formation assistant are not mixed with each other, the film forming property is deteriorated. On the other hand, when one having a short HSP distance is selected, the resin and the film formation assistant are well mixed with each other, so that the film forming property is improved.

A boiling point of the film formation assistant is also important in mixing property of the film formation assistant and the resin. When a film formation assistant having a low boiling point is selected, the film formation assistant evaporates quickly, and a time for mixing the film formation assistant and the resin when the resin is formed into a film is shortened, so that the resin is difficult to swell. On the other hand, when a film formation assistant having a high boiling point is selected, since the time for mixing the film formation assistant and the resin during the film formation becomes longer, the resin is easier to swell, resulting in better film forming property.

Here, when an amount of the film formation assistant is too large, dispersion of the resin becomes unstable due to excessive swelling of the resin, and for example, the resin may precipitate in the resin composition. Therefore, storage stability deteriorates. Therefore, by mixing and using the film formation assistant and a solvent other than the film formation assistant (hereinafter, referred to as a "main solvent") such that the amount of the film formation assistant is not excessively large, the film forming property is improved.

The drying property of the coating film varies depending on, for example, a boiling point of the main solvent (for example, the first solvent in the present disclosure) and a total amount of a diluting solvent (mixed solvent containing the film formation assistant and the main solvent). When the boiling point of the main solvent is high or the total amount of the diluting solvent is large, the solvent remains on the coating film even after the drying, and thus stickiness remains on the coating film. Further, when the boiling point of the main solvent is low or the total amount of the diluting solvent is small, the main solvent or the diluting solvent is dried too quickly at the time of drying, and thus fluidity of the resin in the coating film is inhibited, and as a result, progress of the film formation is inhibited. That is, when balance between the boiling point of the solvent and the total amount of the solvent is poor, the drying property is significantly reduced, and as a result, the film forming property is deteriorated. On the other hand, when the balance between the boiling point of the main solvent and the total amount of the diluting solvent is optimum, since the drying property is good, a function of the film formation assistant is sufficiently maintained, and as a result, the film forming property is good.

However, this mechanism is merely an estimation, and the present disclosure is not limited thereto.

The resin composition may further contain known additives in the related art as necessary. Examples of the additive include a surfactant, a fixing agent, a wet agent, a pH adjuster, a viscosity modifier, a surface tension regulator, and an antifungal agent.

The surfactant is not particularly limited and may be appropriately selected depending on a purpose, for example, a commercially available product may be used. Specific examples of the surfactant include a silicone-based surfactant and an acetylene-based surfactant.

Examples of commercially available products of the silicone-based surfactant include "SILFACE (registered trademark) SAG002", "SILFACE (registered trademark) SAG005", and "SILFACE (registered trademark) SAG503A" manufactured by Nissin Chemical Industry Co., Ltd.

Examples of commercially available products of the acetylene-based surfactant include "olfine (registered trademark) E1004", "olfine (registered trademark) E1008", and "olfine (registered trademark) E1010" manufactured by Nissin Chemical Industry Co., Ltd.; "surfynol (registered trademark) 440", "surfynol (registered trademark) 465", and "surfynol (registered trademark) 485" manufactured by Air Products and Chemicals Inc.; and "acetylenol (registered trademark) E40" and "acetylenol (registered trademark) E100" manufactured by Kawaken Fine Chemicals Co., Ltd.

The resin composition may contain another surfactant in addition to/instead of the silicone-based surfactant or the acetylene-based surfactant. Examples of the other surfactant include nonionic surfactants "EMULGEN (registered trademark)" series, "RHEODOL (registered trademark)" series, "EMASOL (registered trademark)" series, "EXCEL (registered trademark)" series, "EMANON (registered trademark)" series, "AMIET (registered trademark)" series, and "AMINON (registered trademark)" series manufactured by Kao Corp.; nonionic surfactants "SORBON (registered trademark)" series manufactured by Toho Chemical Industry Co., Ltd.; nonionic surfactants "DOBANOX (registered trademark)" series, "LEOCOL (registered trademark)" series, "LEOX (registered trademark)" series, "LAOL, LEOCOL (registered trademark)" series, "LIONOL (registered trademark)" series, "CADENAX (registered trademark)" series, "LIONON (registered trademark)" series, and "LEOFAT (registered trademark)" series manufactured by Lion Corp.; anionic surfactants "EMAL (registered trademark)" series, "LATEMUL (registered trademark)" series, "VENOL (registered trademark)" series, "NEOPELEX (registered trademark)" series, NS SOAP, KS SOAP, OS SOAP, and "PELEX (registered trademark)" series manufactured by Kao Corp.; anionic surfactants "LIPOLAN (registered trademark)" series, "LIPON (registered trademark)" series, "SUNNOL (registered trademark)" series, "LIPOTAC (registered trademark) TE, ENAGICOL" series, "LIPAL (registered trademark)" series, and "LOTAT (registered trademark)" series manufactured by Lion Corp.; and cationic surfactants "Catiogen (registered trademark) ES-OW" and "Catiogen (registered trademark) ES-L" manufactured by Daiichi Kogyo Seiyaku Co., Ltd.

The surfactant may be used alone or in combination of two or more thereof.

The wet agent is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; keto alcohols such as diacetone alcohol; ethers such as tetrahydrofuran and dioxane; polyethers such as polyalkylene glycol; alkylene glycols; polyhydric alcohols such as glycerin, trimethylolpropane, and trimethylolethane; 2-pyrolidone; N-methyl-2-pyrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These wet agents may be used alone or in combination of two or more thereof. Among them, polyhydric alcohols such as alkylene glycol and glycerin are preferable.

Examples of the viscosity modifier include polyvinyl alcohol, cellulose, and a water-soluble resin.

Next, an aqueous ink for ink jet recording of the present disclosure (hereinafter, sometimes referred to as an "aqueous ink" or an "ink") will be described. The aqueous ink of the present disclosure contains the resin composition of the present disclosure and a pigment.

The pigment is not particularly limited, and examples thereof include carbon black, an inorganic pigment, and an organic pigment. Examples of the carbon black include furnace black, lamp black, acetylene black, and channel black. Examples of the inorganic pigment include titanium oxide, iron oxide inorganic pigments, and carbon black inorganic pigments. Examples of the organic pigment include an azo pigment such as azo lake, an insoluble azo pigment, a condensed azo pigment, and a chelate azo pigment; a polycyclic pigment such as a phthalocyanine pigment, a perylene and perinone pigment, an anthraquinone pigment, a quinacridone pigment, a dioxazine pigment, a thioindigo pigment, an isoindolinone pigment, and a quinophthalone pigment; a dye lake pigment such as a basic dye lake pigment and an acid dye lake pigment; a nitro pigment; a nitroso pigment; and an aniline black daylight fluorescent pigment. Another pigment may be used as long as the pigment can be dispersed in an aqueous phase. Specific examples of these pigments include C.I. Pigment Black 1, 6, and 7; C.I. Pigment Yellow 1, 2, 3, 12, 13, 14, 15, 16, 17, 55, 74, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C.I. Pigment Violet 19 and 196; C.I. Pigment Blue 1, 2, 3, 15, 15:1, 15:2, 15:3, 15:4, 16, 22, and 60; C.I. Pigment Green 7 and 36; and solid solutions of the pigments.

The pigment may be dispersed in a solvent with a resin dispersant (also referred to as a resin dispersing pigment). As the resin dispersant, for example, a general high molecular weight dispersant (also referred to as a pigment dispersing resin or a resin dispersant) may be used, and the resin dispersant may be self-prepared. Further, in the aqueous ink of the present disclosure, the pigment may be encapsulated with a polymer. As the resin dispersant, for example, those containing at least one of methacrylic acid and acrylic acid as a monomer can be used, and for example, a commercially available product may be used. The resin dispersant may be, for example, a block copolymer, a graft copolymer, or a random copolymer formed by hydrophobic monomers such as styrene, styrene derivatives, vinylnaphthalene, vinylnaphthalene derivatives, aliphatic alcohol esters of α,β-ethylenically unsaturated carboxylic acids or two or more monomers selected from the group consisting of acrylic acid, acrylic acid derivatives, maleic acid, maleic acid derivatives, itaconic acid, itaconic acid derivatives, fumaric acid, and fumaric acid derivatives, or a salt thereof. Examples of the commercially available product include "Joncryl (registered trademark) 611", "Joncryl (registered trademark) 60", "Joncryl (registered trademark) 586", "Joncryl (registered trademark) 687", "Joncryl (registered trademark) 63", and "Joncryl (registered trademark) HPD296" manufactured by Johnson Polymer Co., Ltd.; "Disperbyk 190" and "Disperbyk 191" manufactured by Bicchemy Japan Co., Ltd.; and "Solsperse 20000" and "Solsperse 27000" manufactured by Zeneca Corp.

Examples of a method for dispersing the pigment using the pigment dispersing resin include dispersing the pigment using a dispersing device. The dispersing device used for dispersing the pigment is not particularly limited as long as the dispersing device is a general disperser, and examples thereof include a ball mill, a roll mill, and a sand mill (for example, a high-speed type sand mill).

The pigment may be a self-dispersing pigment. The self-dispersing pigment can be dispersed in water without using a dispersant, for example, by introducing at least one of a hydrophilic functional group such as a carbonyl group, a hydroxyl group, a carboxylic acid group, a sulfonic acid group, and a phosphate group, and a salt thereof into pigment particles through chemical bonding, either directly or through other groups. As the self-dispersing pigment, for example, pigments treated by methods described in JPH08-003498A, JP2000-513396A, JP2008-524400A, JP2009-515007A, and JP2011-515535A can be used. As a raw material of the self-dispersing pigment, either an inorganic pigment or an organic pigment can be used. Further, examples of the pigment suitable for the treatment include carbon black such as "MA8" and "MA100" manufactured by Mitsubishi Chemical Corporation. The self-dispersing pigment may be, for example, a commercially available product. Examples of the commercially available product include "CAB-O-JET (registered trademark) 200", "CAB-O-JET (registered trademark) 250C", "CAB-O-JET (registered trademark) 260M", "CAB-O-JET (registered trademark) 270Y", "CAB-O-JET (registered trademark) 300", "CAB-O-JET (registered trademark) 400", "CAB-O-JET (registered trademark) 450C", "CAB-O-JET (registered trademark) 465M", and "CAB-O-JET (registered trademark) 470Y" manufactured by Cabot Corporation; "BONJET (registered trademark) BLACK CW-2" and "BONJET (registered trademark) BLACK CW-3" manufactured by Orient Chemical Company; and "LIOJET (registered trademark) WD BLACK 002C" manufactured by TOYO INK CO., LTD.

A concentration of the pigment is not particularly limited, and may be, for example, 2% by weight or more, 4% by weight or more, or 6% by weight or more, and may be, for example, 6% by weight or less, 4% by weight or less, or 2% by weight or less.

The aqueous ink of the present disclosure may further contain a fixing agent as an additive. The fixing agent is used for fixing the colorant to a recording medium. The recording medium is not particularly limited, and examples thereof include a non-absorbent base material and a recording sheet.

Next, a screening method for the second solvent and the resin particles used in the resin composition of the present disclosure or the aqueous ink of the present disclosure will be described. The screening method includes: a step of calculating the relative energy difference (RED); and a step of selecting the second solvent and the resin particles having a relationship in which the RED is less than 3. The calculation method of RED is the same as the calculation method of RED described in the resin composition of the present disclosure.

Next, an ink jet recording device and an ink jet recording method of the present disclosure will be described.

The ink jet recording device of the present disclosure includes a flow path and an applying unit, in which the resin composition or the aqueous ink supplied to the flow path is applied to an object by the applying unit, the resin composition is the resin composition of the present disclosure, and the aqueous ink is the aqueous ink for ink jet recording of the present disclosure.

FIGURE shows a configuration of an example of the ink jet recording device. As shown in the FIGURE, an ink jet recording device 1 includes four ink storage units (ink cartridges 2), an ink discharging unit (ink jet head) 3, a head unit 4, a carriage 5, a drive unit 6, a platen roller 7, and a purge device 8 as main components.

The four ink cartridges 2 storage, for example, four aqueous inks, that is, a yellow ink, a magenta ink, a cyan ink, and a black ink, respectively. For example, at least one of the four aqueous inks is an aqueous ink of the present disclosure. Further, for example, at least one of the aqueous inks may be used as the resin composition of the present disclosure. In this example, a set of four ink cartridges 2 is shown, but instead of this, for example, an integrated ink cartridge which is partitioned so as to form an aqueous yellow ink storage unit, an aqueous magenta ink storage unit, an aqueous cyan ink storage unit, and an aqueous black ink storage unit therein may be used. As a main body of the ink cartridge, for example, a known ink cartridge aqueous in the related art can be used.

The ink jet head 3 provided in the head unit 4 performs recording on a recording medium (for example, a non-absorbent base material) P. The four ink cartridges 2 and the head unit 4 are mounted on the carriage 5. The drive unit 6 reciprocates the carriage 5 in a linear direction. As the drive unit 6, for example, a known drive unit in the related art can be used (for example, see JP2008-246821A). The platen roller 7 extends in a reciprocating direction of the carriage 5 and is disposed in a manner of facing the ink jet head 3.

The ink jet head 3 is formed by stacking a plurality of thin metal plates, for example. A through hole is formed in the thin plates. By stacking the plurality of thin plates in which the through hole is formed, the flow path for passing the aqueous ink is formed. The thin plates are bonded by, for example, an adhesive.

The purge device 8 suctions a defective ink containing air bubbles and the like accumulated inside the ink jet head 3. As the purge device 8, for example, a known purge device in the related art can be used (for example, see JP2008-246821A).

A wiper member 20 is disposed adjacent to the purge device 8 on a platen roller 7 side of the purge device 8. The wiper member 20 is formed in a spatula shape and wipes a nozzle forming surface of the ink jet head 3 as the carriage 5 moves. In FIGURE, a cap 18 covers a plurality of nozzles of the ink jet head 3 to be returned to a reset position when recording is completed in order to prevent drying of the aqueous ink.

In the ink jet recording device 1 of the present embodiment, the four ink cartridges 2 are mounted on one carriage 5 together with the head unit 4. However, the present disclosure is not limited thereto. In the ink jet recording device 1, each of the four ink cartridges 2 may be mounted on a carriage different from the head unit 4. Each of the four ink cartridges 2 may be disposed and fixed in the ink jet recording device 1 without being mounted on the carriage 5. In these aspects, for example, each of the four ink cartridges 2 and the head unit 4 mounted on the carriage 5 are connected by a tube or the like, and the aqueous ink is supplied from each of the four ink cartridges 2 to the head unit 4. Further, in these aspects, four ink bottles each having a bottle shape may be used instead of the four ink cartridges 2. In this case, it is preferable that the ink bottle is provided with an injection port for injecting the ink from an outside to an inside.

Ink jet recording using the ink jet recording device 1 is performed as follows, for example. First, the recording sheet P is fed from a sheet feeding cassette (not shown) provided on a lateral side or a lower side of the ink jet recording device 1. The recording sheet P is introduced between the ink jet head 3 and the platen roller 7. Predetermined recording is performed on the introduced recording sheet P with the aqueous ink discharged from the ink jet head 3. This discharge may be performed, for example, at a first discharge amount as described above, or may be performed at a second discharge amount when a specific condition is satisfied. The recording sheet P after the recording is ejected from the ink jet recording device 1. In FIGURE, a sheet feeding mechanism and a sheet ejecting mechanism of the recording sheet P are not shown.

In the device shown in FIGURE, a serial type ink jet head is used, but the present disclosure is not limited thereto. The ink jet recording device may be a device using a line type ink jet head or roll-to-roll. The serial type ink jet head is an ink jet head that performs printing while reciprocating the ink jet head in a width direction of the recording medium. The line type ink jet head is an ink jet head that covers of the recording medium in the entire width direction. The roll-to-roll is a method for sending out and printing the recording medium in a roll shape, and winding the recording medium in a roll shape again.

The ink jet recording method of the present disclosure includes a recording step of applying the resin composition of the present disclosure or the aqueous ink of the present disclosure to the recording medium by an ink jet method to perform recording. The recording step can be carried out using, for example, the ink jet recording device shown in FIGURE.

The ink jet recording method of the present disclosure may further include, for example, a drying step of heating a recording portion of the recording medium. The drying step is not particularly limited except that the resin composition or the aqueous ink applied to the recording medium, or the solvent (water and solution) contained in the resin composition or the aqueous ink, is removed by evaporation, and can be appropriately selected from a warm wind, a heat platen, a heat press, and the like according to a purpose.

A lower limit value of a drying temperature in the drying step is, for example, 90° C. or more, preferably 100° C. or more, and more preferably 110° C. or more. When the drying temperature is lower than 90° C., volatilization of the water is slow. As a result, for example, since a ratio of the solvent contained in the resin composition or the aqueous ink does not become rich after the application, a film forming effect becomes weaker, and the coating performance deteriorates. On the other hand, when the drying temperature is 90° C. or more, the volatilization of the water is accelerated. As a result, the ratio of the solvent contained in the resin composition or the aqueous ink after the application tends to be rich, the film forming effect becomes stronger, and the coating performance is improved. Therefore, the drying temperature is preferably 90° C. or more. Further, an upper limit value of the drying temperature in the drying step is, for example, a temperature at which abnormal deformation such as wrinkles or burning does not occur in the base material (recording medium), and varies depending on the base material to be used. The upper limit value of the drying temperature may be, for example, 120° C. or less in a case of Scotch Cal graphic film IJ1220 manufactured by 3M Company, and 140° C. or less in a case of "OK Top Coat+" manufactured by OJI PAPER CO., LTD.

The lower limit value of the drying temperature is determined according to the resin composition or the aqueous ink to be used, but in relation to the resin composition or the aqueous ink to be used, the higher the upper limit value of the drying temperature, the better the coating performance tends to be. On the other hand, the higher the drying temperature, the more likely the base material is altered. Therefore, in the present disclosure, the upper limit value of the drying temperature is not particularly limited in relation to the resin composition or the aqueous ink, and is determined by the base material on which the resin composition or the aqueous ink lands.

A lower limit value of the drying time in the drying step is, for example, 1 minute or more, 2 minutes or more, or 3 minutes or more, and an upper limit thereof is, for example, 10 minutes or less, 5 minutes or less, or 4 minutes or less. Drying conditions are preferably such that the drying temperature is 90° C. or more and the drying time is 1 minute or more, and more preferably such that the drying temperature is 110° C. or more and the drying time is 1 minute or more.

EXAMPLES

Next, Examples of the present disclosure will be described together with Comparative Examples. The present disclosure is not limited or restricted by the following Examples and Comparative Examples. In the following description, "parts" and "%" are based on mass unless otherwise specified. Further, various physical properties are measured according to a measurement method to be described later.

[Preparation of Resin Composition and Aqueous Ink] (Examples 1 to 19 and Comparative Examples 1 to 10)

The first solvent, the second solvent, and the resin particles in each of composition tables (Tables 1 to 5) were uniformly mixed to obtain a resin composition. When the resin composition contains a color material, the color material described in each of Tables 1 to 5 were added to the resin composition and uniformly mixed. An obtained mixture was filtered through a cellulose acetate type membrane filter (pore diameter: 3.00 m) manufactured by Toyo Roshi Kaisha, Ltd. to obtain a resin composition and an aqueous ink for ink jet recording in each of Examples 1 to 19 and Comparative Examples 1 to 10 shown in Tables 1 to 5.

[Calculation of RED]

The relative energy difference RED described in Tables 1 to 5 was calculated by the following procedure. First, 1 g of each second solvent described in Tables 1 to 5 or a solvent other than each second solvent was sufficiently mixed with 1 g of a polymer. After the solvent and the polymer were sufficiently stirred, a property of the mixture were observed and classified into three types: "gelling," "white-clouding," and "no change." Next, HSP values of the second solvent and the solvent other than the second solvent were calculated using HSP value calculation software (HSPiP, manufactured by Pirika.com). Next, a sphere (Hansen sphere) containing all the solvents obtained by "gelling" and "white-clouding" the polymer was prepared using the software, and a HSP value of each polymer was calculated from a center of the Hansen sphere. Next, an HSP distance ($R_a$) between the solvent and the resin was calculated from the HSP values of the second solvent and the solvent other than the second solvent and the HSP values of the respective polymers. The HSP distance ($R_a$) was obtained from Calculation Formula (1) described in the above embodiment. Further, the relative energy difference RED ($R_a/R_0$) was calculated from a radius ($R_0$) of the Hansen sphere and the HSP distance ($R_a$).

[Evaluation of Physical Properties]

With respect to the aqueous inks of Examples 1 to 19 and Comparative Examples 1 to 10, (a) surface tackiness immediately after drying, (b) drying unevenness, (c) storage stability (room temperature), (d) an OD value, and (e) solvent resistance were evaluated by the following methods.

In evaluation of the following coating films, the coating films were prepared as follows. First, each of the aqueous inks of Examples 1 to 19 and Comparative Examples 1 to 10 was applied onto a base material (PVC sheeting, product number: Scotch Cal graphic film IJ1220, manufactured by 3M Company) using a bar coater (manufactured by OSG SYSTEM PRODUCTS Co., Ltd., depth: 9 m). This was dried using a warm air dryer at 110° C. for 1 min to obtain a coating film.

(a) Surface Tackiness Immediately after Drying

The surface tackiness immediately after the drying was evaluated by touching the coating film immediately after the preparation with a glove (material: natural rubber, product number: ASPURE Latex Glove, manufactured by AS ONE CORPORATION) for 1 second, and then visually checking transfer of the coating film to the glove and marks left on a coating film surface.

Surface Tackiness Immediately after Drying Evaluation Standard

A: There was no transfer to the glove or any marks left on the coating film surface.

B: There was a transfer to the glove or a mark left on the coating film surface.

(b) Drying Unevenness

The coating film immediately after the preparation was visually observed from an angle of 45 degrees at a distance of about 5 cm from the coating film under irradiation with a fluorescent lamp (product number: FL20SNEDL, manufactured by PANASONIC Co., Ltd.), and the drying unevenness was evaluated from uniformity of the film.

Drying Unevenness Evaluation Standard A: A striped pattern due to the drying was not observed, and the coating film was uniformly formed. B: A striped pattern due to the drying was observed, and a uniform coating film was not formed.

(c) Storage Stability (Room Temperature)

The prepared aqueous ink of each of Examples and Comparative Examples was placed in a sealed container and stored for 5 days in a room temperature environment. The stored ink was observed using a microscope (product number: LV100ND POL/DS, manufactured by Nikon Corporation) at a magnification of 200 times under transmitted light for the presence or absence of aggregation of ink components to evaluate the storage stability in the room temperature environment.

Storage Stability (Room Temperature): Evaluation Standard ○: No aggregation of the ink was observed. x: Aggregation of the ink was observed.

(d) OD Value

Optical density (OD value) of the prepared coating film was measured using a spectral colorimeter exact (filter: M0 (No), light source: D20, viewing angle: 2°, ISO status T) manufactured by X-Rite, Inc., and optical density (OD value) of each of color materials, that is, Mg, Cy, Bk, and Ye materials was evaluated according to the following evaluation standard.

OD Value Evaluation Standard A: Mg: 1.0 or more, Cy: 1.7 or more, Bk: 1.4 or more, and Ye: 1.6 or more; and B: Mg: less than 1.0, Cy: less than 1.7, Bk: less than 1.4, and Ye: less than 1.6

(e) Solvent Resistance

A cloth for evaluation (canequim No. 3) impregnated with 300 μL of 70% ethanol was set in a gakushin-type rubbing fastness tester (AB-301, manufactured by TESTER SANGYO CO., LTD.), and a surface of the prepared coating film was rubbed under conditions of a load of 200 g, 3.6 m/min, and five reciprocating movements to evaluate the solvent resistance of the coating film. In a solvent resistance test, a coating film was prepared under the same conditions as described above except that the drying conditions were changed to the conditions described in each of Tables 1 to 5. Specifically, the solvent resistance of Examples and Comparative Examples was evaluated under the drying conditions of "110° C. and 1 min". Further, in order to check the solvent resistance under a lower temperature drying condition, representative Examples 1 to 2, 7, and 11 to 15 were also evaluated under drying conditions of "90° C. and 1 min".

Solvent Resistance Evaluation Standard A: An area of coating film peeling due to rubbing was less than 30%. B: An area of coating film peeling due to rubbing was 30% or more and less than 70%. C: An area of coating film peeling due to rubbing was 70% or more.

An aqueous ink composition and an evaluation result of the aqueous ink of each of Examples 1 to 19 and Comparative Examples 1 to 10 are shown in Tables 1 to 5.

TABLE 1

| | | Boiling point | Example 1 | Example 2 | Example 3 | Example 4 | Example 5 | Example 6 | Example 7 |
|---|---|---|---|---|---|---|---|---|---|
| Solvent | Dipropylene glycol methyl ether (DPM) | 188 | | | | | | | |
| | Propylene glycol (PG) | 188 | | | | | | | |
| | 1,3-propanediol | 214 | 12.0 | 13.0 | 13.0 | 18.0 | 12.0 | 15.0 | 13.0 |
| | 1,2-hexanediol | 223 | | | | | | | |
| | Dipropylene glycol n-butyl ether (DPnB) | 230 | | | | | | | |
| | Polyethylene glycol 400 (PEG 400) | 250 | | | | | | | |
| | 2-pyrolidone | 251 | | | | | | | |
| | Tripropylene glycol (TPG) | 270 | 12.0 | | | | 12.0 | | 15.0 |
| | Tripropylene glycol n-butyl ether (TPnB) | 274 | | | | 9.0 | | | |
| | Triethylene glycol (TEG) | 276 | | | | | | | |
| | Triethylene glycol monobutyl ether (BTG) | 278 | | 9.0 | 7.0 | | | | |
| | Glycerin (Gly) | 290 | | | | | | | |
| | Polyethylene glycol monomethyl ether | 300 | | | | | | 10.0 | |
| Polymer R *Solid content concentration | Mowinyl ® 6969D (*1) | | 8.4 | 8.4 | 8.1 | 8.0 | 8.0 | 7.9 | 8.2 |
| | Mowinyl ® 6899D (*2) | | | | | | | | |
| | JE-1056 (*3) | | | | | | | | |
| | Vinyblan ® 715S (*4) | | | | | | | | |
| Surfactant | Olfine ® E1004 (*5) | | 1.0 | 1.0 | 1.0 | 1.0 | 1.0 | 1.0 | 1.0 |
| Color material *Solid content concentration | Pigment dispersion A (*6) | | 3.1 | | | | | 2.5 | |
| | Pigment dispersion B (*7) | | | 3.0 | | | | | |
| | Pigment dispersion C (*8) | | | | 3.2 | | | | 3.0 |
| | Pigment dispersion D (*9) | | | | | 4.0 | | | |
| | Water | | Balance | Balance | Balance | Balance | Balance | Balance | Balance |
| First solvent | S1 | | 12.0 | 13.0 | 13.0 | 18.0 | 12.0 | 15.0 | 13.0 |
| Second solvent | Solvent having boiling point of 250° C. or more | | Presence | Presence | Presence | Presence | Presence | Presence | Presence |
| | Relative energy difference (Ra/Ro) RED calculated from HSP distance (Ra) between solvent having boiling point of 250° C. or more and resin particles and Hansen sphere radius (Ro) | | 2.6 | 1.0 | 1.0 | 1.0 | 2.6 | 1.6 | 2.6 |
| | S2 | | 12.0 | 9.0 | 7.0 | 9.0 | 12.0 | 10.0 | 15.0 |
| | S2/R | | 1.43 | 1.07 | 0.86 | 1.13 | 1.50 | 1.27 | 1.83 |
| | S2/S1 | | 1.00 | 0.69 | 0.54 | 0.50 | 1.00 | 0.67 | 1.15 |
| | S1 + S2 | | 24 | 22 | 20 | 27 | 24 | 25 | 28 |
| | Surface tackiness immediately after drying | | A | A | A | A | A | A | A |
| | Drying unevenness | | A | A | A | A | A | A | A |
| | Storage stability (room temperature) | | ○ | ○ | ○ | ○ | ○ | ○ | ○ |

TABLE 1-continued

| | Boiling point | Example 1 | Example 2 | Example 3 | Example 4 | Example 5 | Example 6 | Example 7 |
|---|---|---|---|---|---|---|---|---|
| Solvent resistance | 120° C. × 1 min | A | A | — | — | — | — | A |
| | 110° C. × 1 min | A | A | B | A | A | A | A |
| | 90° C. × 1 min | B | B | — | — | — | — | B |

(*1): Acrylic resin emulsion, manufactured by Japan Coating Resin Corp.
(*2): Acrylic resin emulsion, manufactured by Japan Coating Resin Corp.
(*3): Acrylic resin emulsion, manufactured by SEIKO PMC CORPORATION
(*4): Vinyl chloride-acrylic copolymer emulsion, manufactured by Nissin Chemical Industry Co., Ltd.
(*5): Acetylene glycol-based surfactant (ethylene oxide of diol (10 mol)) adduct, manufactured by Nissin Chemical Industry Co., Ltd., active ingredient = 100%
(*6): Aqueous dispersion of C.I. Pigment Red 122 (containing resin dispersant): numerical values in table indicate pigment solid blending amount.
(*7): Aqueous dispersion of C.I. Pigment Blue 15:3 (containing resin dispersant): numerical values in table indicate pigment solid blending amount.
(*8): Aqueous dispersion of carbon black: numerical values in table indicate pigment solid blending amount.
(*9): Aqueous dispersion of C.I. Pigment Yellow 155 (containing resin dispersant): numerical values in table indicate pigment solid blending amount.

TABLE 2

| | | Boiling point | Example 8 | Example 9 | Example 10 | Example 11 | Example 12 | Example 13 |
|---|---|---|---|---|---|---|---|---|
| Solvent | Dipropylene glycol methyl ether (DPM) | 188 | | | | | | |
| | Propylene glycol (PG) | 188 | | | | | 13.0 | |
| | 1,3-propanediol | 214 | 23.0 | 33.0 | 3.0 | | | 13.0 |
| | 1,2-hexanediol | 223 | | | | 12.0 | | |
| | Dipropylene glycol n-butyl ether (DPnB) | 230 | | | | | | |
| | Polyethylene glycol 400 (PEG 400) | 250 | | | | | | |
| | 2-pyrolidone | 251 | | | | | | |
| | Tripropylene glycol (TPG) | 270 | 10.0 | 9.0 | 12.0 | 10.0 | 10.0 | |
| | Tripropylene glycol n-butyl ether (TPnB) | 274 | | | | | | |
| | Triethylene glycol (TEG) | 276 | | | | | | |
| | Triethylene glycol monobutyl ether (BTG) | 278 | | | | | | 10.0 |
| | Glycerin (Gly) | 290 | | | | | | |
| | Polyethylene glycol monomethyl ether | 300 | | | | | | |
| Polymer R *Solid content concentration | Mowinyl ® 6969D (*1) | | 6.8 | 6.9 | 7.5 | 9.0 | 7.6 | |
| | Mowinyl ® 6899D (*2) | | | | | | | 8.4 |
| | JE-1056 (*3) | | | | | | | |
| | Vinyblan ® 715S (*4) | | | | | | | |
| Surfactant | Olfine ® E1004 (*5) | | 1.0 | 1.0 | 1.0 | 1.0 | 1.0 | 1.0 |
| Color material *Solid content concentration | Pigment dispersion A (*6) | | | | 2.6 | 4.1 | | |
| | Pigment dispersion B (*7) | | 2.8 | | | | 2.7 | |
| | Pigment dispersion C (*8) | | | | | | | 2.5 |
| | Pigment dispersion D (*9) | | | 3.2 | | | | |
| | Water | | Balance | Balance | Balance | Balance | Balance | Balance |
| First solvent | S1 | | 23.0 | 33.0 | 3.0 | 12.0 | 13.0 | 13.0 |
| Second solvent | Solvent having boiling point of 250° C. or more | | Presence | Presence | Presence | Presence | Presence | Presence |
| | Relative energy difference (Ra/Ro) RED calculated from HSP distance (Ra) between solvent having boiling point of 250° C. or more and resin particles and Hansen sphere radius (Ro) | | 2.6 | 2.6 | 2.6 | 2.6 | 2.6 | 0.6 |
| | S2 | | 10.0 | 9.0 | 12.0 | 10.0 | 10.0 | 10.0 |
| | S2/R | | 1.47 | 1.30 | 1.60 | 1.11 | 1.32 | 1.19 |
| | S2/S1 | | 0.43 | 0.27 | 4.00 | 0.83 | 0.77 | 0.77 |
| | S1 + S2 | | 33 | 42 | 15 | 22 | 23 | 23 |
| | Surface tackiness immediately after drying | | A | A | A | A | A | A |
| | Drying unevenness | | A | B | B | A | A | A |
| | Storage stability (room temperature) | | ○ | ○ | ○ | ○ | ○ | ○ |
| | Solvent resistance | 120° C. × 1 min | — | — | — | A | A | A |
| | | 110° C. × 1 min | B | B | B | A | A | A |
| | | 90° C. × 1 min | — | — | — | A | B | B |

(*1): Acrylic resin emulsion, manufactured by Japan Coating Resin Corp.
(*2): Acrylic resin emulsion, manufactured by Japan Coating Resin Corp.
(*3): Acrylic resin emulsion, manufactured by SEIKO PMC CORPORATION
(*4): Vinyl chloride-acrylic copolymer emulsion, manufactured by Nissin Chemical Industry Co., Ltd.
(*5): Acetylene glycol-based surfactant (ethylene oxide of diol (10 mol)) adduct, manufactured by Nissin Chemical Industry Co., Ltd., active ingredient = 100%
(*6): Aqueous dispersion of C.I. Pigment Red 122 (containing resin dispersant): numerical values in table indicate pigment solid blending amount.
(*7): Aqueous dispersion of C.I. Pigment Blue 15:3 (containing resin dispersant): numerical values in table indicate pigment solid blending amount.
(*8): Aqueous dispersion of carbon black: numerical values in table indicate pigment solid blending amount.
(*9): Aqueous dispersion of C.I. Pigment Yellow 155 (containing resin dispersant): numerical values in table indicate pigment solid blending amount.

TABLE 3

| | | Boiling point | Example 14 | Example 15 | Example 16 | Example 17 | Example 18 | Example 19 |
|---|---|---|---|---|---|---|---|---|
| Solvent | Dipropylene glycol methyl ether (DPM) | 188 | | | | | | |
| | Propylene glycol (PG) | 188 | | | | | | |
| | 1,3-propanediol | 214 | 13.0 | 13.0 | 13.0 | 13.0 | 13.0 | 13.0 |
| | 1,2-hexanediol | 223 | | | | | | |
| | Dipropylene glycol n-butyl ether (DPnB) | 230 | | | | | | |
| | Polyethylene glycol 400 (PEG 400) | 250 | | | | | | |
| | 2-pyrolidone | 251 | | | | | | |
| | Tripropylene glycol (TPG) | 270 | | | | | 10.0 | |
| | Tripropylene glycol n-butyl ether (TPnB) | 274 | 10.0 | | | 9.0 | | |
| | Triethylene glycol (TEG) | 276 | | | | | | |
| | Triethylene glycol monobutyl ether (BTG) | 278 | | 9.0 | | | | 9.0 |
| | Glycerin (Gly) | 290 | | | | | | |
| | Polyethylene glycol monomethyl ether | 300 | | | 9.0 | | | |
| Polymer R | Mowinyl ® 6969D (*1) | | | | | | 8.4 | 8.4 |
| *Solid content | Mowinyl ® 6899D (*2) | | | | | | | |
| concentration | JE-1056 (*3) | | 8.4 | 8.4 | 9.0 | | | |
| | Vinyblan ® 715S (*4) | | | | | 8.0 | | |
| Surfactant | Olfine ® E1004 (*5) | | 1.0 | 1.0 | 1.0 | 1.0 | 1.0 | 1.0 |
| Color material | Pigment dispersion A (*6) | | 3.0 | | | | 1.5 | 5.0 |
| *Solid content | Pigment dispersion B (*7) | | | | 3.2 | | | |
| concentration | Pigment dispersion C (*8) | | | | | | | |
| | Pigment dispersion D (*9) | | | 2.9 | | 2.8 | | |
| | Water | | Balance | Balance | Balance | Balance | Balance | Balance |
| First solvent | S1 | | 13.0 | 13.0 | 13.0 | 13.0 | 13.0 | 13.0 |
| Second solvent | Solvent having boiling point of 250° C. or more | | Presence | Presence | Presence | Presence | Presence | Presence |
| | Relative energy difference (Ra/Ro) RED calculated from HSP distance (Ra) between solvent having boiling point of 250° C. or more and resin particles and Hansen sphere radius (Ro) | | 1.0 | 0.8 | 1.0 | 1.0 | 2.6 | 1.0 |
| | S2 | | 10.0 | 9.0 | 9.0 | 9.0 | 10.0 | 9.0 |
| | S2/R | | 1.19 | 1.07 | 1.00 | 1.13 | 1.19 | 1.07 |
| | S2/S1 | | 0.77 | 0.69 | 0.69 | 0.69 | 0.77 | 0.69 |
| | S1 + S2 | | 23 | 22 | 22 | 22 | 23 | 22 |
| | Surface tackiness immediately after drying | | A | A | A | A | A | A |
| | Drying unevenness | | A | A | A | A | A | A |
| | Storage stability (room temperature) | | ○ | ○ | ○ | ○ | ○ | ○ |
| | Solvent resistance | 120° C. × 1 min | A | A | — | — | — | — |
| | | 110° C. × 1 min | A | A | A | A | A | A |
| | | 90° C. × 1 min | A | A | — | — | — | — |

(*1): Acrylic resin emulsion, manufactured by Japan Coating Resin Corp.
(*2): Acrylic resin emulsion, manufactured by Japan Coating Resin Corp.
(*3): Acrylic resin emulsion, manufactured by SEIKO PMC CORPORATION
(*4): Vinyl chloride-acrylic copolymer emulsion, manufactured by Nissin Chemical Industry Co., Ltd.
(*5): Acetylene glycol-based surfactant (ethylene oxide of diol (10 mol) adduct, manufactured by Nissin Chemical Industry Co., Ltd., active ingredient = 100%
(*6): Aqueous dispersion of C.I. Pigment Red 122 (containing resin dispersant): numerical values in table indicate pigment solid blending amount.
(*7): Aqueous dispersion of C.I. Pigment Blue 15:3 (containing resin dispersant): numerical values in table indicate pigment solid blending amount.
(*8): Aqueous dispersion of carbon black: numerical values in table indicate pigment solid blending amount.
(*9): Aqueous dispersion of C.I. Pigment Yellow 155 (containing resin dispersant): numerical values in table indicate pigment solid blending amount.

TABLE 4

| | | Boiling point | Comparative Example 1 | Comparative Example 2 | Comparative Example 3 | Comparative Example 4 | Comparative Example 5 |
|---|---|---|---|---|---|---|---|
| Solvent | Dipropylene glycol methyl ether (DPM) | 188 | | | | | 11.0 |
| | Propylene glycol (PG) | 188 | | | | | |
| | 1,3-propanediol | 214 | | 13.0 | 12.0 | 14.0 | 15.0 |
| | 1,2-hexanediol | 223 | | | | | |
| | Dipropylene glycol n-butyl ether (DPnB) | 230 | | | | 9.0 | |
| | Polyethylene glycol 400 (PEG 400) | 250 | | | | | |
| | 2-pyrolidone | 251 | | | 8.0 | | |
| | Tripropylene glycol (TPG) | 270 | 10.0 | | | | |
| | Tripropylene glycol n-butyl ether (TPnB) | 274 | | | | | |
| | Triethylene glycol (TEG) | 276 | 13.0 | | | | |
| | Triethylene glycol monobutyl ether (BTG) | 278 | | | | | |
| | Glycerin (Gly) | 290 | | 10.0 | | | |
| | Polyethylene glycol monomethyl ether | 300 | | | | | |
| Polymer R | Mowinyl@ 6969D (*1) | | 8.4 | 8.4 | 8.4 | 8.4 | 8.4 |
| *Solid content | MowinyI ® 6899D (*2) | | | | | | |
| concentration | JE-1056 (*3) | | | | | | |
| | Vinyblan@ 715S (*4) | | | | | | |

TABLE 4-continued

| | | Boiling point | Comparative Example 1 | Comparative Example 2 | Comparative Example 3 | Comparative Example 4 | Comparative Example 5 |
|---|---|---|---|---|---|---|---|
| Surfactant | Olfine ® E1004 (*5) | | 1.0 | 1.0 | 1.0 | 1.0 | 1.0 |
| Color material *Solid content concentration | Pigment dispersion A (*6) | | 3.1 | | | 2.5 | |
| | Pigment dispersion B (*7) | | | | | | |
| | Pigment dispersion C (*8) | | | 3.2 | | | 3.0 |
| | Pigment dispersion D (*9) | | | | 4.0 | | |
| | Water | | Balance | Balance | Balance | Balance | Balance |
| First solvent | S1 | | 0.0 | 13.0 | 12.0 | 23.0 | 26.0 |
| Second solvent | Solvent having boiling point of 250° C. or more | | Presence | Presence | Presence | Absent | Absent |
| | Relative energy difference (Ra/Ro) RED calculated from HSP distance (Ra) between solvent having boiling point of 250° C. or more and resin particles and Hansen sphere radius (Ro) | | 2.6 | 10.5 | 4.4 | — | — |
| | S2 | | 10.0 | — | — | — | — |
| | S2/R | | 1.19 | — | — | — | — |
| | S2/S1 | | — | — | — | — | — |
| | S1 + S2 | | 10 | — | — | — | — |
| | Surface tackiness immediately after drying | | C | C | A | A | A |
| | Drying unevenness | | A | A | A | A | A |
| | Storage stability (room temperature) | | ○ | ○ | ○ | ○ | ○ |
| | Solvent resistance | 120° C. × 1 min | — | — | — | — | — |
| | | 110° C. × 1 min | C | C | C | C | C |
| | | 90° C. × 1 min | — | — | — | — | — |

(*1): Acrylic resin emulsion, manufactured by Japan Coating Resin Corp.
(*2): Acrylic resin emulsion, manufactured by Japan Coating Resin Corp.
(*3): Acrylic resin emulsion, manufactured by SEIKO PMC CORPORATION
(*4): Vinyl chloride-acrylic copolymer emulsion, manufactured by Nissin Chemical Industry Co., Ltd.
(*5): Acetylene glycol-based surfactant (ethylene oxide of diol (10 mol)) adduct, manufactured by Nissin Chemical Industry Co., Ltd., active ingredient = 100%
(*6): Aqueous dispersion of C.I. Pigment Red 122 (containing resin dispersant): numerical values in table indicate pigment solid blending amount.
(*7): Aqueous dispersion of C.I. Pigment Blue 15:3 (containing resin dispersant): numerical values in table indicate pigment solid blending amount.
(*8): Aqueous dispersion of carbon black: numerical values in table indicate pigment solid blending amount.
(*9): Aqueous dispersion of C.I. Pigment Yellow 155 (containing resin dispersant): numerical values in table indicate pigment solid blending amount.

TABLE 5

| | | Boiling point | Comparative Example 6 | Comparative Example 7 | Comparative Example 8 | Comparative Example 9 | Comparative Example 10 |
|---|---|---|---|---|---|---|---|
| Solvent | Dipropylene glycol methyl ether (DPM) | 188 | | | | | |
| | Propylene glycol (PG) | 188 | | | | 29.5 | 25.0 |
| | 1,3-propanediol | 214 | 23.0 | 13.0 | 13.0 | | |
| | 1,2-hexanediol | 223 | | | | | |
| | Dipropylene glycol n-butyl ether (DPnB) | 230 | | | | | |
| | Polyethylene glycol 400 (PEG 400) | 250 | | | | | |
| | 2-pyrolidone | 251 | | | | | |
| | Tripropylene glycol (TPG) | 270 | | 5.0 | 15.0 | 1.0 | |
| | Tripropylene glycol n-butyl ether (TPnB) | 274 | | | | | |
| | Triethylene glycol (TEG) | 276 | | | | | |
| | Triethylene glycol monobutyl ether (BTG) | 278 | | | | | 3.0 |
| | Glycerin (Gly) | 290 | | | | | |
| | Polyethylene glycol monomethyl ether | 300 | | | | | |
| Polymer R *Solid content concentration | Mowinyl ® 6969D (*1) | | 8.4 | 8.4 | 6.0 | 4.0 | 5.0 |
| | Mowinyl ® 6899D (*2) | | | | | | |
| | JE-1056 (*3) | | | | | | |
| | Vinyblan ® 715S (*4) | | | | | | |
| Surfactant | Olfine ® E1004 (*5) | | 1.0 | 1.0 | 1.0 | 2.0 | 1.0 |
| Color material *Solid content concentration | Pigment dispersion A (*6) | | | | 2.6 | | 2.5 |
| | Pigment dispersion B (*7) | | 2.8 | | | | |
| | Pigment dispersion C (*8) | | | | | | |
| | Pigment dispersion D (*9) | | | 3.2 | | 4.0 | |
| | Water | | Balance | Balance | Balance | Balance | Balance |
| First solvent | S1 | | 23.0 | 13.0 | 13.0 | 29.5 | 25.0 |
| Second solvent | Solvent having boiling point of 250° C. or more | | Absent | Presence | Presence | Presence | Presence |
| | Relative energy difference (Ra/Ro) RED calculated from HSP distance (Ra) between solvent having boiling point of 250° C. or more and resin particles and Hansen sphere radius (Ro) | | | 2.6 | 2.6 | 2.6 | 1.0 |
| | S2 | | — | 5.0 | 15.0 | 1.0 | 3.0 |
| | S2/R | | — | 0.60 | 2.50 | 0.25 | 0.60 |
| | S2/S1 | | — | 0.38 | 1.15 | 0.03 | 0.12 |
| | S1 + S2 | | — | 18 | 28 | 31 | 28 |
| | Surface tackiness immediately after drying | | A | A | A | A | A |

TABLE 5-continued

| | Boiling point | Comparative Example 6 | Comparative Example 7 | Comparative Example 8 | Comparative Example 9 | Comparative Example 10 |
|---|---|---|---|---|---|---|
| Drying unevenness | | A | A | A | A | A |
| Storage stability (room temperature) | | ○ | ○ | x | ○ | ○ |
| Solvent resistance | 120° C. × 1 min | — | — | — | — | — |
| | 110° C. × 1 min | C | C | A | C | C |
| | 90° C. × 1 min | — | — | — | — | — |

(*1): Acrylic resin emulsion, manufactured by Japan Coating Resin Corp.
(*2): Acrylic resin emulsion, manufactured by Japan Coating Resin Corp.
(*3): Acrylic resin emulsion, manufactured by SEIKO PMC CORPORATION
(*4): Vinyl chloride-acrylic copolymer emulsion, manufactured by Nissin Chemical Industry Co., Ltd.
(*5): Acetylene glycol-based surfactant (ethylene oxide of diol (10 mol) adduct, manufactured by Nissin Chemical Industry Co., Ltd., active ingredient = 100%
(*6): Aqueous dispersion of C.I. Pigment Red 122 (containing resin dispersant): numerical values in table indicate pigment solid blending amount.
(*7): Aqueous dispersion of C.I. Pigment Blue 15:3 (containing resin dispersant): numerical values in table indicate pigment solid blending amount.
(*8): Aqueous dispersion of carbon black: numerical values in table indicate pigment solid blending amount.
(*9): Aqueous dispersion of C.I. Pigment Yellow 155 (containing resin dispersant): numerical values in table indicate pigment solid blending amount.

As shown in Tables 1 to 5, in Examples 1 to 19, the storage stability was "o", the solvent resistance after drying at 110° C. was "B" or more, and the storage stability and the solvent resistance were excellent. The surface tackiness immediately after drying was "A" or more, and the drying unevenness was "B" or more.

In Examples 1 to 7 and 10 to 19 in which the blending ratio (S2/S1) was 0.3 to 3.0, the evaluation of the drying unevenness was more excellent than those of the other Examples, and all were "A" or more.

Furthermore, in Examples 1, 2, 4 to 6, and 10 to 19 in which the blending ratio (S2/R) was 0.9 to 2.0 and the total amount (S1+S2) of the blending amount (S1) of the first solvent and the blending amount (S2) of the second solvent was 30 or less, the solvent resistance was more excellent than those of the other Examples, and all were "A" or more.

In addition, in Examples 1 to 4 and 6 to 19 containing the pigment, the surface tackiness immediately after drying was "A" or more, the drying unevenness was "B" or more, the storage stability was "o", the solvent resistance when dried at 110° C. was "B" or more, and the OD value was "B" or more.

On the other hand, in Comparative Example 1 in which the first solvent having a boiling point of 250° C. or more was used, the surface tackiness immediately after drying and the solvent resistance when dried at 110° C. were evaluated as "C". Further, in Comparative Examples 2 to 5 and 9 to 10 which did not satisfy a requirement of the second solvent, at least one of the surface tackiness immediately after drying and the solvent resistance when dried at 110° C. was evaluated as "C". Further, in Comparative Examples 6 to 8 in which the blending ratio (S2/R) did not satisfy 0.7 to 2.0, the storage stability was "x" or the solvent resistance when dried at 110° C. was "C". In Comparative Examples, both the storage stability and the solvent resistance could not be achieved.

A part or all of the above embodiments and Examples may be described as the following appendixes, but are not limited thereto.

Appendix 1

A resin composition including:
resin particles, water, a first solvent, and a second solvent,
wherein the first solvent is a solvent having a boiling point of less than 250° C.,
wherein the second solvent is a solvent having a boiling point of 250° C. or more, and RED indicating a relative energy difference ($R_a/R_0$) calculated from an HSP distance ($R_a$) between the second solvent and the resin particles and a radius ($R_0$) of a sphere (Hansen sphere) including only a plot of the second solvent in which the resin particles are dissolved in a Hansen space is 3 or less,
wherein the HSP distance is calculated from an HSP value of the second solvent and an HSP value of the resin particles,
wherein the HSP value of the resin particles is calculated from a center coordinate of the Hansen sphere, and
wherein a blending ratio (S2/R) of a blending amount (S2) of the second solvent to a solid blending amount (R) of the resin particles is 0.7 to 2.3.

Appendix 2

The resin composition according to appendix 1,
wherein a blending ratio (S2/S1) of the blending amount (S2) of the second solvent to a blending amount (S1) of the first solvent is 0.3 to 3.0.

Appendix 3

The resin composition according to appendix 1 or 2,
wherein the blending ratio (S2/R) is 0.9 to 2.0, and
wherein a total amount (S1+S2) of a blending amount (S1) of the first solvent and the blending amount (S2) of the second solvent is 30 or less.

Appendix 4

An aqueous ink for ink jet recording, including:
the resin composition according to any one of appendixes 1 to 3 and a pigment.

Appendix 5

An ink jet recording device including:
a flow path and an applying unit,
wherein a resin composition supplied to the flow path is applied to an object by the applying unit, and
wherein the resin composition is the resin composition according to any one of appendixes 1 to 3.

Appendix 6

An ink jet recording device including:
a flow path and an applying unit, wherein an aqueous ink supplied to the flow path is applied to an object by the applying unit, and wherein the aqueous ink is the aqueous ink for ink jet recording according to appendix 4.

Appendix 7

An ink jet recording method including:

a recording step of performing recording by applying a resin composition to a recording medium by an ink jet method, wherein the resin composition is the resin composition according to any one of appendixes 1 to 3.

Appendix 8

An ink jet recording method including:

a recording step of performing recording by applying an aqueous ink to a recording medium by an ink jet method, wherein the aqueous ink is the aqueous ink for ink jet recording according to appendix 4.

Appendix 9

The ink jet recording method according to appendix 7, further including:

a drying step of heating a recording portion of the recording medium, a drying temperature in the drying step is 90° C. or more.

Appendix 10

The ink jet recording method according to appendix 8, further including:

a drying step of heating a recording portion of the recording medium, wherein a drying temperature in the drying step is 90° C. or more.

As described above, the resin composition and the aqueous ink of the present disclosure achieve both the storage stability and the solvent resistance. The resin composition and the aqueous ink of the present disclosure are widely applicable to ink jet recording on various recording media.

While the invention has been described in conjunction with various example structures outlined above and illustrated in the FIGURES, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A resin composition comprising:
resin particles comprising a resin;
water;

a first solvent having a boiling point of less than 250° C.; and a second solvent having a boiling point of 250° C. or more, wherein:

a relative energy difference (RED), $R_a/R_0$, in the Hansen solubility parameter (HSP) system between the second solvent and the resin is 3 or less;

$R_a$ is an HSP distance between the second solvent and the resin;

$R_0$ is a radius of a Hansen sphere of the resin, the Hansen sphere being determined so as to include coordinates of solvents having a boiling point of 250° C. or more in which the resin is dissolvable;

a mass ratio of the second solvent to a solid component of the resin particles in the resin composition is 0.7 to 2.3; and an amount of the second solvent in the resin composition relative to a total mass of the resin composition is 7% by mass or more.

2. The resin composition according to claim 1,
wherein a mass ratio of the second solvent to the first solvent in the resin composition is 0.3 to 3.0.

3. The resin composition according to claim 2,
wherein mass ratio of the second solvent to the solid component of the resin particles in the resin composition is 0.9 to 2.0, and wherein a total amount the first solvent and the second solvent in the resin composition relative to the total mass of the resin composition is 30% by mass or less.

4. An aqueous ink for ink jet recording, comprising:
the resin composition according to claim 1; and
a pigment.

5. An ink jet recording device comprising:
the resin composition according to claim 1;
a flow path through which the resin composition flows; and an applying unit connecting to the flow path and configured to apply the resin composition onto an object for recording.

6. An ink jet recording device comprising:
the aqueous ink according to claim 4;
a flow path through which the aqueous ink flows; and
an applying unit connecting to the flow path and configured to apply the aqueous ink onto an object for recording.

7. An ink jet recording method comprising:
applying the resin composition according to claim 1 onto a recording medium by an ink jet method.

8. An ink jet recording method comprising:
applying the aqueous ink according to claim 4 onto a recording medium by an ink jet method.

9. The ink jet recording method according to claim 7, further comprising:
heating a portion of the recording medium on which the resin composition is applied at a temperature of 90° C. or more to dry the portion.

10. The ink jet recording method according to claim 8, further comprising:
heating a portion of the recording medium on which the resin composition is applied at a temperature of 90° C. or more to dry the portion.

* * * * *